United States Patent [19]

Takada et al.

[11] Patent Number: 5,781,323

[45] Date of Patent: Jul. 14, 1998

[54] OPTICAL SCANNER

[75] Inventors: Kyu Takada; Nozomu Inoue; Takashi Hama; Yujiro Nomura, all of Nagano, Japan

[73] Assignee: Seiko Epson Corporation, Tokyo, Japan

[21] Appl. No.: 744,746

[22] Filed: Nov. 6, 1996

Related U.S. Application Data

[63] Continuation of Ser. No. 451,396, May 26, 1995, Pat. No. 5,600,476.

[30] Foreign Application Priority Data

Jan. 30, 1995 [JP] Japan ............................. HEI 7-033038

[51] Int. Cl.$^6$ ................................................. G02B 26/08
[52] U.S. Cl. ........................... 359/206; 359/207; 359/215; 347/259
[58] Field of Search .................................. 359/196, 197, 359/205, 206, 207, 215; 347/256, 258, 259

[56] References Cited

U.S. PATENT DOCUMENTS

| | | | |
|---|---|---|---|
| 4,866,459 | 9/1989 | Tokita et al. | 346/108 |
| 4,971,411 | 11/1990 | Takanashi | 359/206 |
| 5,005,928 | 4/1991 | Suzuki et al. | 359/206 |
| 5,128,795 | 7/1992 | Endou et al. | 359/207 |
| 5,200,850 | 4/1993 | Iizuka et al. | 359/206 |
| 5,329,399 | 7/1994 | Ho | 359/662 |
| 5,563,729 | 10/1996 | Nakamura et al. | 359/205 |
| 5,598,292 | 1/1997 | Yoshikawa et al. | 359/206 |
| 5,619,362 | 4/1997 | Ota | 359/205 |

FOREIGN PATENT DOCUMENTS

| | | |
|---|---|---|
| A20328915 | 8/1989 | European Pat. Off. . |
| A20461660 | 12/1991 | European Pat. Off. . |
| A10559423 | 9/1993 | European Pat. Off. . |

OTHER PUBLICATIONS

Applied Optics, vol. 30, No. 6, Feb. 20, 1991, pp. 699–704. Arimoto et al., "Laser Scanning System Using a Rotationally Asymmetric Aspheric Surface".

Primary Examiner—Paul M. Dzierzynski
Assistant Examiner—Darren E. Schuberg
Attorney, Agent, or Firm—Sughrue, Mion, Zinn, Macpeak & Seas, PLLC

[57] ABSTRACT

An optical scanner for use in laser beam printers and the like which is particularly satisfactory in imaging characteristics. A light beam from a semiconductor laser passes through a collimator lens, an aperture diaphragm and a cylindrical lens. The beam is then deflected by a rotating lens mirror and subjected to the focusing action of an imaging lens so that it is focused to form a beam spot, which scans over a scan surface as the beam is deflected. The imaging lens has aspheric surfaces in the main-scanning cross section and is designed so that the rate of change in its curvature and other relevant parameters satisfy a predetermined equation so as to lie within a predetermined range.

5 Claims, 13 Drawing Sheets

OPTICAL SCANNER

This is a continuation of application Ser. No. 08/451,396 filed May 26, 1995 now U.S. Pat. No. 5,600,476.

BACKGROUND OF THE INVENTION

The present invention relates to an optical scanner for use in a laser beam printer and other apparatus.

An optical scanner conventionally used in a laser beam printer and other apparatus comprises a light source such as a semiconductor laser, a collimator lens that collimates the light beam issued from the light source, a rotating polygonal mirror that deflects the collimated beam for scanning, and an imaging lens that focuses the deflected light to form a beam spot on a scan surface.

The imaging lens is required to have the following two aberrational characteristics: i) a specified negative value of distortion that is necessary to achieve scanning at uniform velocity, and ii) a smaller curvature of the field that reduces the beam spot size to nearly the diffraction limit, thereby producing a flat image plane.

The imaging lens can be composed of one or more lens elements. If good aberrational characteristics are required, many lens elements are used; if cost is important, a single lens is used. To provide further improved aberrational characteristics, the use of an imaging lens having an aspheric surface is often used today, as typically taught in JPA 92/50908.

A spherical lens surface has the same curvature in every position. On the other hand, an aspheric lens surface has varying local curvatures in different positions. Therefore, the aspheric imaging lens described in JPA 92/50908 has a problem in that if the light beam passing through the lens has a diameter greater than a certain value, the local curvature varies with position even within a cross section of the beam on the aspheric surface. As a result, the wavefront of the beam that has undergone transformation by the aspheric surface is disturbed to become deteriorated in imaging characteristics, whereby the shape of the beam spot is deformed. The amount of asphericity can range from one extreme that has a negligible departure from a spherical surface to another that has a point of inflection, changing from concave to convex or conversely in the center of the optical axis and at either edge. The deformation of the beam spot is particularly noticeable in the latter case.

With the recent advances in laser beam printer technology for higher resolution, there is a growing need for optical scanners to form even smaller beam spots. A Gaussian beam is such that in order to produce a beam spot smaller with a lens having the certain focal length, a beam having a wider divergence angle has to be stopped down. This requires a large-diameter, rather than small-diameter, beam to be introduced into the lens. Therefore, a further improvement in the resolving power of laser beam printers is difficult to achieve unless the problem described in the preceding paragraph is solved.

The imaging lens used in the conventional optical scanner has the following problems.

1) The optical magnification of the imaging lens in the sub-scanning direction differs between the center of the lens and either edge, producing a nonuniform beam spot size in the sub-scanning direction. Additionally, an increased number of lens elements have to be used in order to provide a uniform optical magnification in the sub-scanning direction.

2) The thickness of the imaging lens in the axial direction is comparatively greater than the lens height in the sub-scanning direction, so that internal strain tends to occur during molding the lens with plastics, causing a displacement in the focal point or deterioration in the imaging characteristics.

3) The main-scanning cross section of the imaging lens is thick in the center of the lens but thin at either edge, and the difference is so great that when molding the lens with plastics, the molten resin flows unevenly to develop internal strain.

4) Since a collimated beam is admitted into the imaging lens, the latter must have a great positive refractive power, but then the thickness of the main-scanning cross section of the lens is so much greater in the center than at either edge that the thickness profile of the lens is extremely uneven.

5) Being solely composed of axially symmetric surfaces, the imaging lens has only a small degree of freedom with regard to correct aberraitions and is incapable of satisfactory correction for field curvature and scanning at uniform velocity in both the main and sub-scanning directions. In addition, the imaging lens must be composed of an increased number of lens elements in order to achieve satisfactory correction of aberrations.

6) If the reflecting face of the deflection means tilts, the scanning line will be displaced.

7) Since the imaging lens has a constant curvature in the sub-scanning direction, the curvature of the field in the sub-scanning direction cannot be adequately reduced. In addition, the imaging lens must be composed of an increased number of lens elements in order to ensure that the field curvature developing in the sub-scanning direction is adequately reduced.

8) An imaging lens formed of curved surfaces on both sides requires high production cost and, additionally, a high degree of precision is required in aligning the optical axes of both surfaces.

9) If the sub-scanning cross section of one surface of an imaging lens is linear, the degree of freedom in optical design in the sub-scanning direction must be dedicated to the correction of field curvature and it is no longer possible to produce a uniform beam spot size.

An object, therefore, of the present invention is to provide an optical scanner using an imaging lens with aspheric surfaces, the parameters of which satisfy a specified relationship in order to ensure satisfactory imaging characteristics without deformation in the shape of a beam spot while making the scanner suitable for operation at higher resolution.

SUMMARY OF THE INVENTION

The present invention relates basically to an optical scanner comprising a light source for emitting a light beam, deflection means for deflecting said light beam as it rotates at a uniform angular velocity, and an imaging lens for forming a beam spot on a scan surface by focusing the light beam that has been deflected by said deflection means, said imaging lens having aspheric surfaces in the main-scanning cross section, the improvement wherein parameters e, n, w and ρ relating to said aspheric surfaces satisfy the following condition:

$$\frac{1}{2g} \left| \sum_i \rho_i(y_i) e_i u_i w_i^2 (n_i - 1) \right| < 2.5$$

where

-continued $$\rho_i(y_s) = \frac{dc_i(v_i(y))}{dy} \bigg|_{y=y_s}$$

$c_i(v_i)$: curvature of lens surface $S_i$ at height $v_i$ from the optical axis;

$e_i$: distance between lens surfaces $S_i$ and the scan surface;

g: main-scanning radius of the beam spot at zero image height;

$n_i$: refractive index of the imaging lens forming lens surface $S_i$;

$S_i$: ith lens surface;

$u_i$: coefficient indicating whether lens surface $S_i$ is an entrance or an exit face;
 $u_i=1$ (entrance face)
 $u_i=-1$ (exit face)

$v_i(y_s)$: height from the optical axis of the point at which the principal ray at image height $y_s$ passes through lens surface $S_i$;

$w_i$: main-scanning cross-sectional radius of a light beam on lens surface $S_i$ that passes along the optical axis of lens surface $S_i$;

y: coordinate representing the height from the optical axis in the main-scanning direction;

$y_s$: image height on the scan surface; and $\rho_i(y_s)$: rate of change in curvature at the point where the principal ray at image height $y_s$ passes through lens surface $S_i$, as calculated by differentiating curvature $c_i$ with respect to y.

In specific embodiments of the invention, the optical scanner may have either one of the following additional structural features.

1) The scanner further satisfies the following condition in the effective area of said main-scanning cross section of the lens surface $S_i$ of the imaging lens:

$$|\Delta z_i(y)| \left( \frac{1}{a-b_i} + \frac{1}{b_i} \right) < 0.2$$

where $\Delta z_i(y)$: axial displacement of lens surface $S_i$ at height y from the optical axis;

$b_i$: distance from a deflecting point of said deflection means to the lens surface $S_i$; and a: distance from the deflecting point to said scan surface.

2) The scanner further satisfies the following condition in the sub-scanning cross section of the imaging lens:

$$h/t > 2$$

where t: thickness of the imaging lens in the direction of the optical axis; and h: height of the imaging lens in the sub-scanning direction.

3) The scanner further satisfies the following condition in the effective area of the main-scanning cross section of the imaging lens:

$$t_{max}/t_{min} < 2$$

where $t_{max}$: maximum thickness of the imaging lens in the direction of the optical axis; and $t_{min}$: minimum thickness of the imaging lens in the direction of the optical axis.

4) The light beam admitted into the imaging lens is convergent in the main-scanning cross section.

5) The imaging lens has different refractive powers in the main-scanning and sub-scanning directions.

In design (5), the deflecting point and the scan surface may be optically conjugated in the sub-scanning cross section. In another case of design (5), the curvature of a cross section parallel to the sub-scanning cross section may vary continuously along the main-scanning direction in the effective area of the imaging lens in at least one surface thereof.

In the last-mentioned case, the sub-scanning cross section may be linear in at least one surface of the imaging lens. Alternatively, the curvature of a cross section parallel to the sub-scanning cross section may vary continuously along the main-scanning direction in the effective area of the imaging lens in both surfaces thereof.

Having these structural features, the present invention offers the following outstanding operational advantages.

The imaging lens having aspheric surfaces is designed so that parameters relating to the aspheric surfaces satisfy the specified relationship, whereby the shape of the main-scanning cross section of a beam spot is set so that its deformation causes no practical problems.

The imaging lens may be adapted to have a specified shape, whereby a uniform optical magnification is attained in the sub-scanning direction between the imaging point in the vicinity of the reflecting face of the deflection means and the imaging point on the scan surface, so that both the beam spot size and the resolution are uniform.

Also, the cross section of the imaging lens may be adapted to have a specified shape so as to reduce the refractive index distribution in a direction perpendicular to the direction of the beam travel. This is effective in preventing the displacement of the focal point or deterioration in the imaging characteristics.

The shape of the effective area of the main-scanning cross section of the imaging lens may have a thickness of t specified so that the tendency of a molten synthetic resin to flow unevenly during molding is inhibited to prevent the occurrence of internal strain.

Furthermore, the light beam introduced into the imaging lens is convergent in the main-scanning cross section and, hence the imaging lens needs to have only a small refractive power. As a result, the thickness of the lens can be brought close to uniformity.

Yet further, the imaging lens may have different refractive powers in the main and sub-scanning directions, in which case the correction of aberrations in the main-scanning direction can be performed independently of the correction in the sub-scanning direction. This contributes to a greater degree of freedom in optical design.

The deflecting point and the scan surface may be optically conjugated in the sub-scanning cross section. Therefore, even if the rotating polygonal mirror or lens mirror has a tilting reflecting face, the position of the beam spot on the scan surface in the sub-scanning direction will not change and there will be no displacement of the scanning line.

The exit surface of the imaging lens is preferably such that the curvature of a cross section parallel to the sub-scanning cross section varies continuously along the main-scanning direction in the effective area of the imaging lens, and hence the curvature of a cross section parallel to the sub-scanning cross section can be set at a desired value in any position in the effective area of the imaging lens. This allows for complete correction of curvature of the field that may occur in the sub-scanning direction.

5

One of the two surfaces of the imaging lens may be linear in the cross sub-scanning section, which provides ease in manufacturing the imaging lens, thereby reducing the cost of its production. If a single lens has two optical curved surfaces, the precision in the relative positions of the optical axes of the two surfaces becomes a problem, yet it is strictly required to achieve alignment between the two optical axes. No such requirement need be satisfied in the sub-scanning cross section if the imaging lens is designed as a planoconvex lens in the sub-scanning cross section.

Finally, both surfaces of the imaging lens may have curvatures which vary continuously in the sub-scanning cross section, and an additional degree of freedom in optical design is imparted in the sub-scanning direction. As a result, a truly constant beam spot size can be produced in the sub-scanning direction.

6

Figure 22:
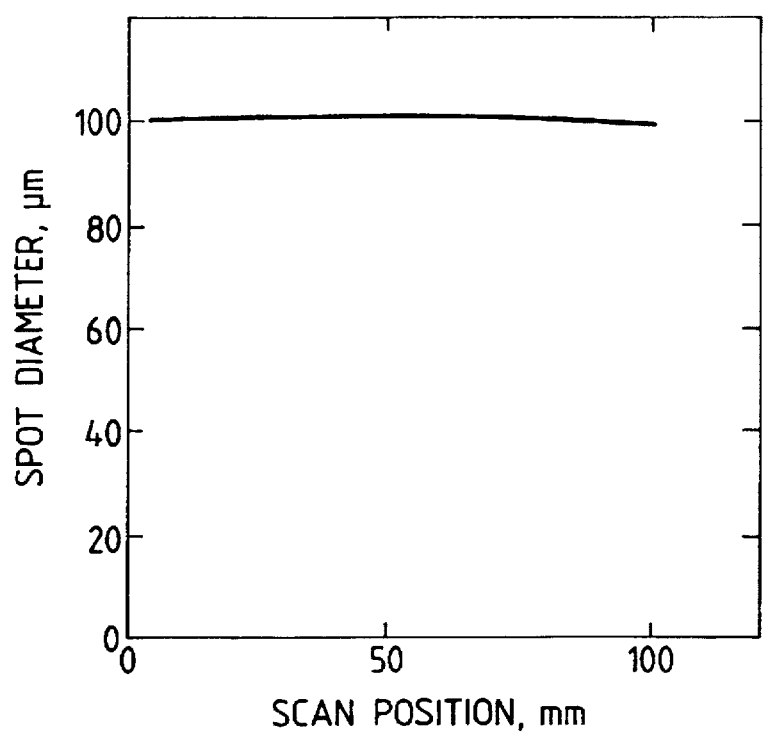

FIG. 22 is a graph plotting the variation in beam spot size that occurred in Example 2.

DESCRIPTION OF THE PREFERRED EMBODIMENTS

Examples of the present invention will now be described with reference to the accompanying drawings.

Figure 1:
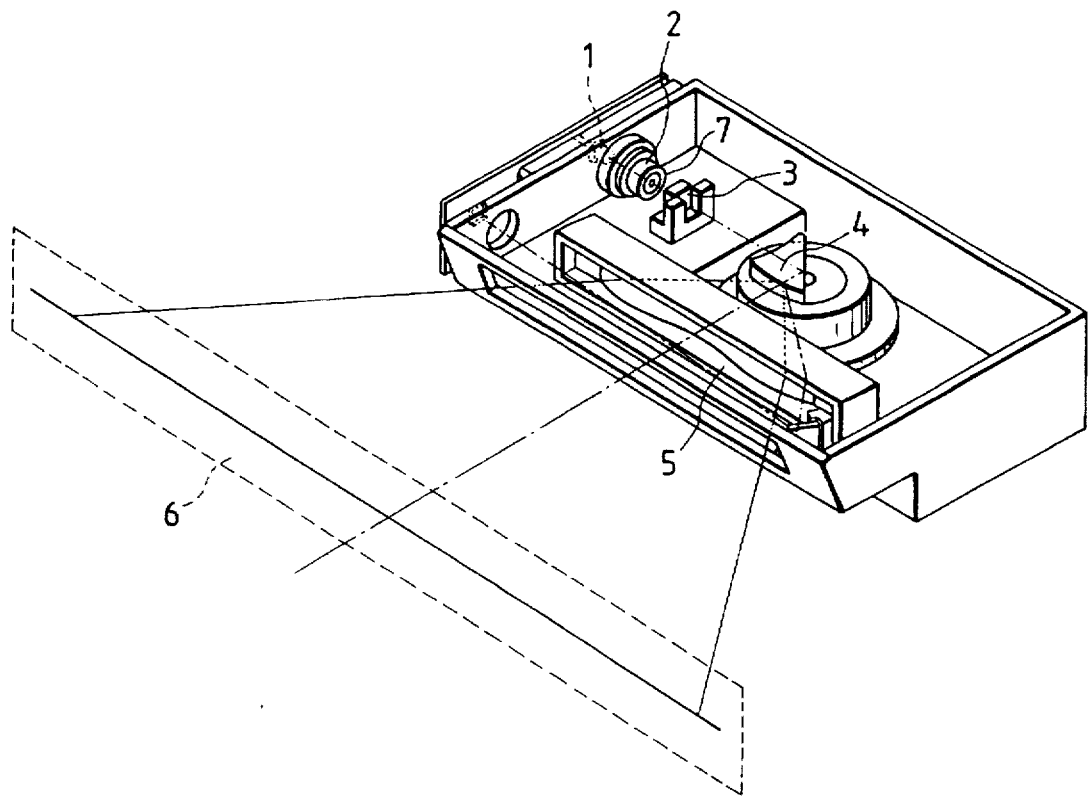
FIG. 1 is a perspective view of the optical scanner according to Example 1 of the invention.

FIG. 1 is a perspective view showing the construction of an optical scanner according to Example 1 of the invention. A light beam issuing from a light source (semiconductor laser) 1 is stopped down by an aperture diaphragm 7, converted to a slightly convergent beam by a collimator lens 2, and subjected to the focusing action of a cylindrical lens 3 only in the sub-scanning direction. The term "sub-scanning direction" means a direction that is parallel to the rotating axis of deflection means such as a rotating lens mirror 4. A direction perpendicular to both the sub-scanning direction and the optical axis is called the "main-scanning direction". The beam falls on the entrance surface of the rotating lens mirror 4 serving as the deflection means. Imaging occurs only in the sub-scanning direction in the vicinity of the reflecting surface. The beam, after being reflected by the reflecting surface, emerges from the exit surface. The entrance and exit surfaces both have a refractive power only in the main-scanning direction and are concave and convex cylindrical surfaces, respectively. The reflecting surface of the lens mirror 4 is flat. The incident beam is deflected as the lens mirror 4 rotates. The deflected beam is subjected to the focusing action of an imaging lens 5 and forms a beam spot on a scan surface 6.

Figure 2:
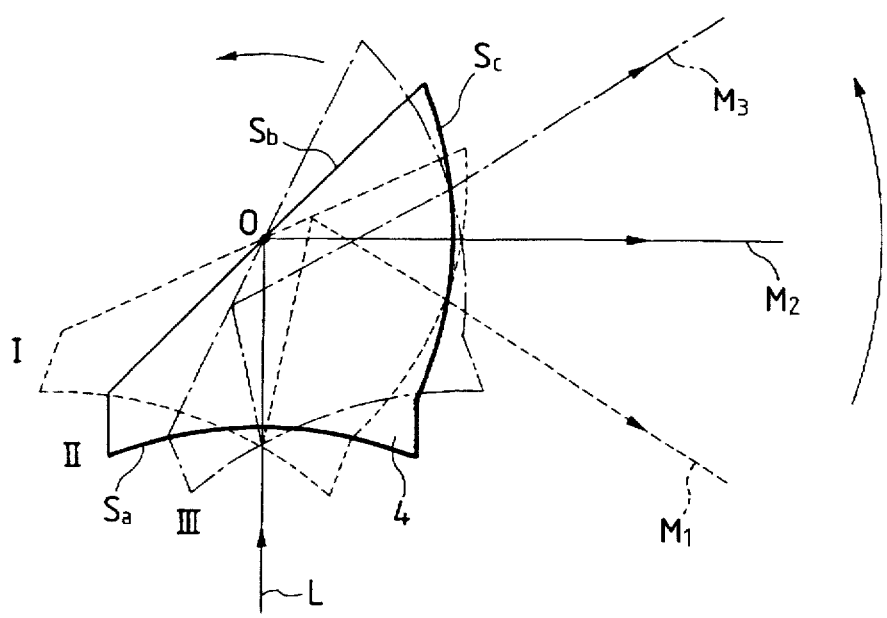
FIG. 2 is a diagram showing how a light beam is deflected as the lens mirror used in Example 1 rotates.

FIG. 2 shows how the beam is deflected as the lens mirror 4 rotates. The entrance surface $S_a$ and the exit surface $S_c$ of the lens mirror are set so that a beam scanning the scan center will pass these surfaces perpendicularly. The reflecting surface $S_b$ is set so that the beam scanning the scan center falls on this surface at an angle of 45°. The rotating axis O of the lens mirror 4 is included in the reflecting surface $S_b$ and passes through a point at which the beam scanning the scan center is reflected. The optical axes of the entrance surface $S_a$ and the exit surface $S_c$ coincide with the optical path of the beam scanning the scan center. The lens mirror 4 rotates about the axis O and will be displaced successively through stages I, II and III that are indicated by the dashed line, the solid line and the one-short-and-one-long dashed line, respectively. As the lens mirror 4 rotates in this manner, the incident beam L falls on the entrance surface $S_a$ in different positions at different angles, whereupon it is refracted to deflect by that surface $S_a$. The beam is reflected by the reflecting face $S_b$ to deflect at a greater angle and then refracted by the exit surface $S_c$ so that it emerges as a deflected beam indicated by $M_1$, $M_2$ or $M_3$.

The construction of the imaging lens 5 used in Example 1 is shown in cross section in FIG. 9 and will now be described in detail. The entrance surface $R_1$ and the exit surface $R_2$ of the imaging lens 5 used in Example 1 are aspheric in the main-scanning cross section (the "main-scanning cross section" is a plane that includes the optical axis and which is parallel to the main-scanning direction). These aspheric surfaces have different curvatures in different positions. If the variation is so great that the curvature will vary considerably even within the range of the beam diameter, the wavefront of the beam that is subjected to conversion by the aspheric surfaces is disturbed to no longer be spherical and its imaging characteristics will deteriorate. To avoid this problem, the asphericity related parameters e, n, w and ρ of the imaging lens 5 used in Example 1 satisfy the following condition:

$$\frac{1}{2g}\left|\sum_i \rho_i(y_s)e_i u_i w_i^2(n_i-1)\right|<2.5$$

where $$\rho_i(y_s)=\left.\frac{dc_i(v_i(y))}{dy}\right|_{y=y_s}$$

$c_i(v_i)$: curvature of lens surface $S_i$ at height $v_i$ from the optical axis;

$e_i$: distance between lens surfaces $S_i$ and the scan surface;

g: main-scanning radius of the beam spot at zero image height;

$n_i$: refractive index of the imaging lens forming lens surface $S_i$;

$S_i$: ith lens surface;

$u_i$: coefficient indicating whether lens surface $S_i$ is an entrance or an exit face;
$u_i=1$ (entrance face)
$u_i=-1$ (exit face)

$v_i(y_s)$: height from the optical axis of the point at which the principal ray at image height $y_s$ passes through lens surface $S_i$;

$w_i$: main-scanning cross-sectional radius of a light beam on lens surface $S_i$ that passes along the optical axis of lens surface $S_i$;

y: coordinate representing the height from the optical axis in the main-scanning direction;

$y_s$: image height on the scan surface; and $\rho_i(y_s)$: rate of change in curvature at the point where the principal ray at image height $y_s$ passes through lens surface $S_i$, as calculated by differentiating curvature $c_i$ with respect to y.

Figure 3A:
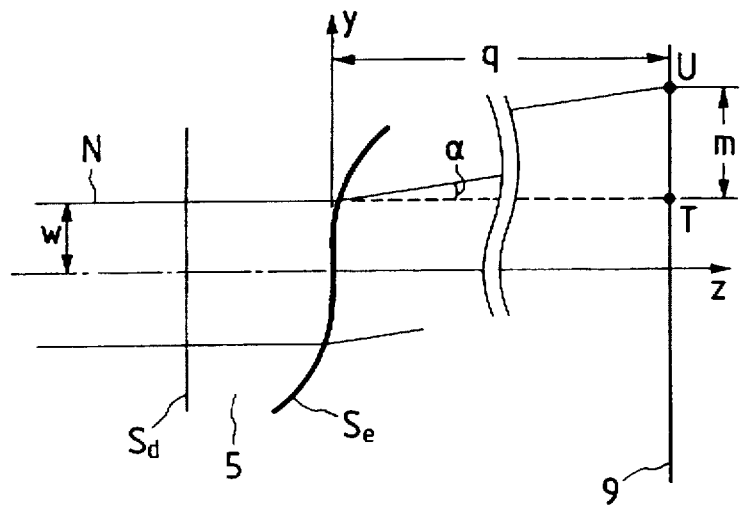
FIGS. 3a and 3b are diagrams showing the optical paths of two beams that pass through an aspheric lens.

With this design, the shape of the beam spot is deformed only slightly to cause no practical problems. A specific procedure of calculations is given below to prove this point with reference to a typical example. As FIG. 3a shows, let us assume for simplicity that the entrance surface $S_d$ of the imaging lens 5 is flat whereas the exit surface $S_e$ is paraxially flat except that it is provided with an aspheric displacement. A parallel beam passes through the imaging lens 5 along the optical axis. The main-scanning cross-sectional radius of the beam at the exit surface $S_e$ is written as w. The beam's cross-sectional radius w means the radius of a geometry that is formed by connecting the points in the cross section of the beam where the beam intensity is $1/e^2$ of the intensity at the center of the beam. The point at which the exit surface $S_e$ crosses the optical axis is set as the origin and the z axis extends along the optical axis whereas the y axis extends in a direction normal to the optical axis. Surfaces having a varying curvature are represented by a cubic curve. Hence, the exit surface $S_e$ may be expressed by:

$$z=ky^3$$

where k is a constant.

Then, the change in curvature $\rho$ is paraxially a cubic differential of z with respect to y, as expressed by:

$$\rho=6k$$

Considering that the beam has a thickness with the radius w, it may be regarded as a bundle of rays. Based on this assumption, let us trace the ray N passing at the point off the optical axis by distance w. If the exit surface $S_e$ inclines by $3kw^2$ at the height w from the optical axis and if the imaging lens 5 has a refractive index of n, then the angle $\alpha$, the ray issuing from the exit surface $S_e$, forms with the optical axis is approximately expressed by:

$$\alpha=3kw^2(n-1)$$

Hence, the rate of change in curvature $\rho$ is related to the angle $\alpha$ by:

$$\alpha=\rho w^2(n-1)/2$$

The position U where the ray N intersects a plane 9 which is away from the exit surface $S_e$ by distance q deviates from the position T where the same ray intersects the plane 9 if the exit surface $S_e$ has no aspheric displacement, and the deviation m is given by:

$$m=\rho q w^2(n-1)/2$$

The central ray travels straight on the optical axis without making any displacements in the y direction. The foregoing calculations show that if the beam having the radius w is regarded as a bundle of rays, a ray is caused to deviate on the plane 9 by a surface the curvature of which changes at the rate $\rho$ and the maximum deviation is m.

Figure 3B:
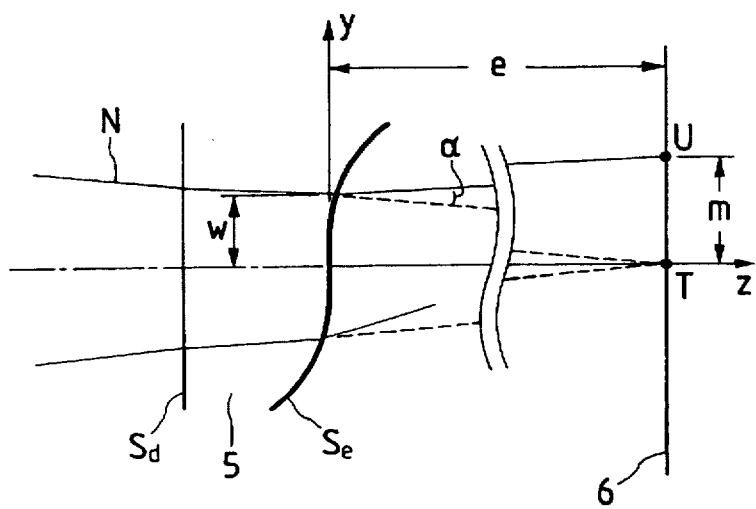

The foregoing explanation concerns the case where a parallel beam reaches the plane 9 without forming any beam spot. In practice, the beam should ideally focus at a point on the scan surface 6, and FIG. 3b shows what occurs when a beam that focuses at a point on the scan surface 6 passes through an imaging lens having an aspheric displacement. As in FIG. 3a, the exit surface $S_e$ of the imaging lens 5 is aspheric. If the distance between the exit surface $S_e$ and the scan surface 6 is written as e, the position U where the ray N intersects the scan surface 6 deviates from the position T where the same ray intersects the surface 6 if the exit surface $S_e$ has no aspheric displacement, and the deviation m is given by:

$$m=\rho e w^2(n-1)/2$$

If the deviation m is unduly great, the individual rays in the beam will not converge at a point on the scan surface 6 even if a focus is set on this surface and, instead, a deformed beam spot will appear and its imaging characteristics are deteriorated.

Figure 4A:
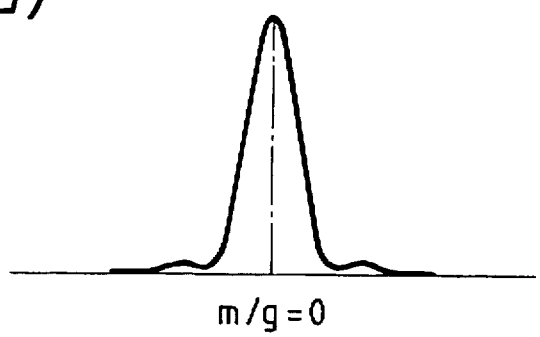
FIGS. 4a, 4b and 4c are waveform charts showing the intensity distribution across a beam spot.
Figure 4B:
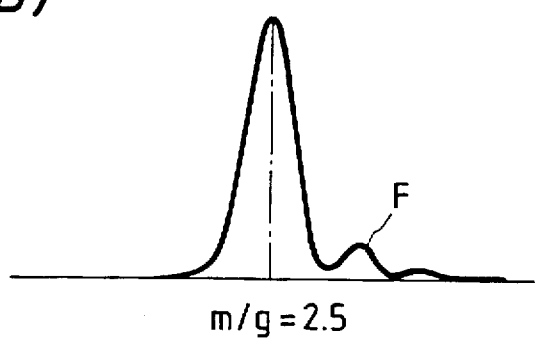
Figure 4C:
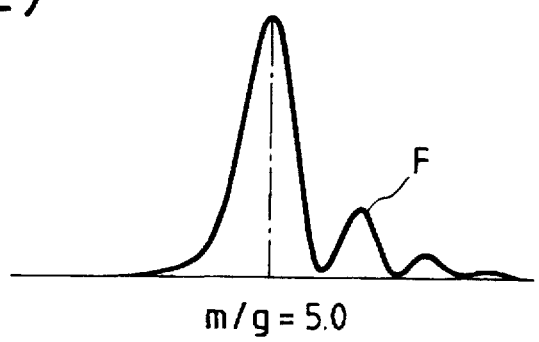
Figure 5:
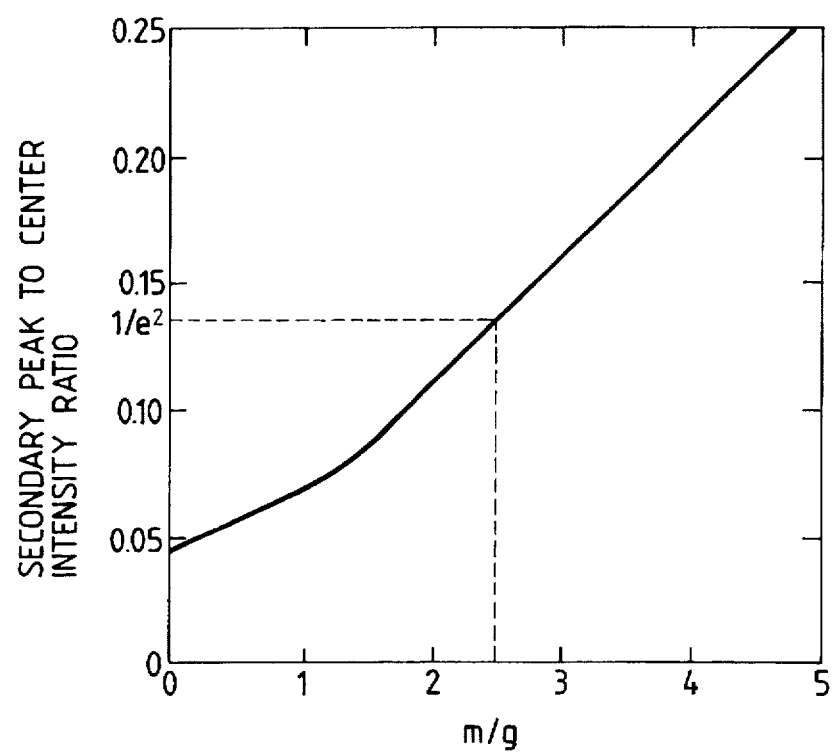
FIG. 5 is a graph showing the intensity profile of a secondary peak of a light beam.

We next discuss the relationship between the ray deviation m on the scan surface 6 and the deformed shape of the beam spot on the basis of the result of a simulation. The letter g is used to represent the radius of the beam spot on the scan surface 6. The term "radius of the beam" means the radius of a geometry that is obtained by connecting the points where the beam intensity is $1/e^2$ of the intensity at the center of the beam. The profile of the cross-sectional intensity of the beam spot is substantially determined solely by the ratio between the ray deviation m and the beam spot radius g (m/g). As FIGS. 4a, 4b and 4c show, the increasing value of m/g is accompanied by a corresponding increase in the secondary peak F on the side of the beam. FIG. 5 is a graph in which the intensity of the secondary peak relative to the central intensity of the beam is plotted against m/g. If the intensity of the secondary peak increases, adjacent dots will also be illuminated with the beam and the resolving power of the optical scanner will deteriorate. In addition, a laser print using the optical scanner will produce blurred prints. In the case of printed patterns composed of fine dots, the contrast will decrease to give only poor print quality. According to the experiment conducted by the present inventors, the intensity of the secondary peak should preferably be smaller than $1/e^2$ of the central intensity in order to ensure satisfactory imaging characteristics for the optical scanner and to guarantee satisfactory print quality on a laser beam printer. Therefore, according to FIG. 5, the following condition should preferably be met:

$$|m|/g<2.5$$

Hence, $|p|ew_2(n-1)/2g<2.5$

If the optical scanner is to be used on a color printer and other printers that require even finer tonal gradations, the value of $|m|/g$ are desirably much smaller.

If more than one aspheric surface is used, the ray deviation on the scan surface is the accumulation of the deviations due to the changes in the curvatures of the respective aspheric surfaces, provided that the direction in which rays are reflected differs between the entrance and exit surfaces. Hence, using the coefficient u that determines whether a particular lens surface is the entrance or exit surface, the imaging lens should satisfy the following condition:

$$\frac{1}{2g} \left| \sum_i \rho_i e_i \mu_i w_i^2 (n_i - 1) \right| < 2.5$$

where $u_i = 1$ (entrance surface)

$u_i = -1$ (exit surface)

If the imaging lens has a uniform thickness and if the entrance surface has the same geometry as the exit surface, the effects of the change in curvature will cancel each other at the entrance and exit surfaces to produce no deviation in rays.

While the foregoing conclusion applies to an axial beam, it also holds with extraaxial oblique beams and the following condition must be satisfied in this case:

$$\frac{1}{2g} \left| \sum_i \rho_i (y_s) e_i u_i w_i^2 (n_i - 1) \right| < 2.5$$

where $$\rho_i(y_s) = \frac{dc_i(v_i(y))}{dy}$$

$y_s$: image height on the scan surface;

$v_i(y_s)$: height from the optical axis of the point at which the principal ray at image height $y_s$ passes through lens surface $S_i$; and $c_i(v_i)$: curvature of lens surface $S_i$ at height $v_i$ from the optical axis.

Figure 6:
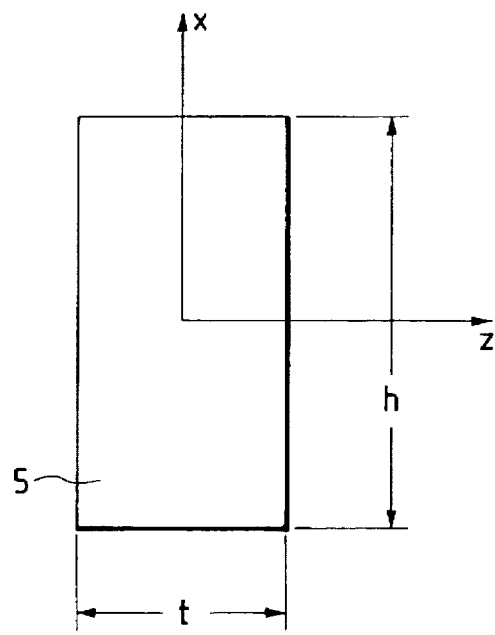
FIG. 6 is a cross section of an imaging lens as taken in the sub-scanning direction.

It should be mentioned here that the aspheric imaging lens for use in the optical scanner of the invention is desirably fabricated by molding with plastics because the aspheric surface can be easily formed at low cost. However, if the cooling rate is uneven during molding of a lens with plastics, internal strain may sometimes occur to produce an uneven refractive index profile. Hence, the present inventors investigated conditions under which the index distribution would not be a problem. As FIG. 6 shows, the sub-scanning cross section of the imaging lens 5 is assumed to be rectangular for simplicity (the "sub-scanning cross section" is a plane that includes the optical axis and which is parallel to the sub-scanning direction), and the lens has a thickness of t in the axial direction and a height of h in the sub-scanning direction. The origin of the coordinates is assumed to lie at the center of the cross section of the lens and the z axis extends in the axial direction whereas the x axis extends in the sub-scanning direction.

With a rectangular cross section, isothermal curves associated with cooling are substantially parallel in the longitudinal direction and, hence, the refractive index profile is substantially uniform in the longitudinal direction but an index distribution occurs in a direction normal to that longitudinal direction. The index distribution along the beam travel has no effects on the imaging characteristics of the imaging lens but any index distribution that occurs in the normal direction will displace the focal point or deteriorate the imaging characteristics. Therefore, the effects of the index distribution will decrease with the decreasing thickness (t) and the increasing height (h).

Figure 7:
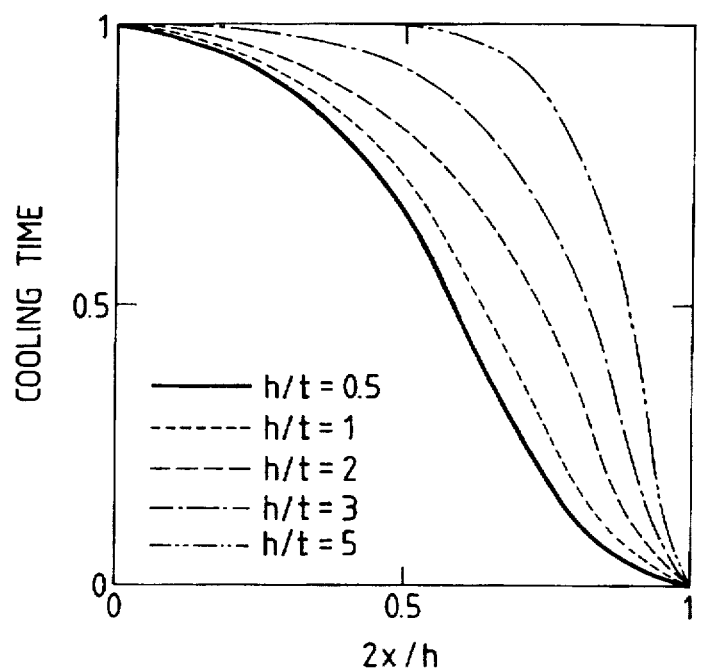
FIG. 7 is a graph showing the profile of imaging lens cooling rate.

In order to investigate how the rate of cooling within the lens would vary with the ratio between its height (h) and thickness (t), a numerical analysis was performed. The assumed model was such that the lens that had an initial temperature of $T_1$ throughout was cooled in an environment having a temperature of $T_2$. FIG. 7 is a graph plotting the cooling time required for the temperature $T_3$ at each point on the x axis to reach an intermediate between $T_1$ and $T_2$, namely, $T_3=(T_1+T_2)/2$. The horizontal axis of the graph is the x coordinate normalized with h/2, or one half the lens height; 2x/h=0 represents the center of the lens and 2x/h=1 an edge of the lens in the direction of its thickness. The vertical axis is normalized with the time of cooling at the center of a cross section of the lens (at the origin). Thus, FIG. 7 shows the profile of cooling time in a direction normal to the beam travel. Obviously, the greater the value of h/t, the cooling time approaches a constant value (unity) near the center of the lens, thereby providing a more uniform profile of the cooling rate.

Figure 8:
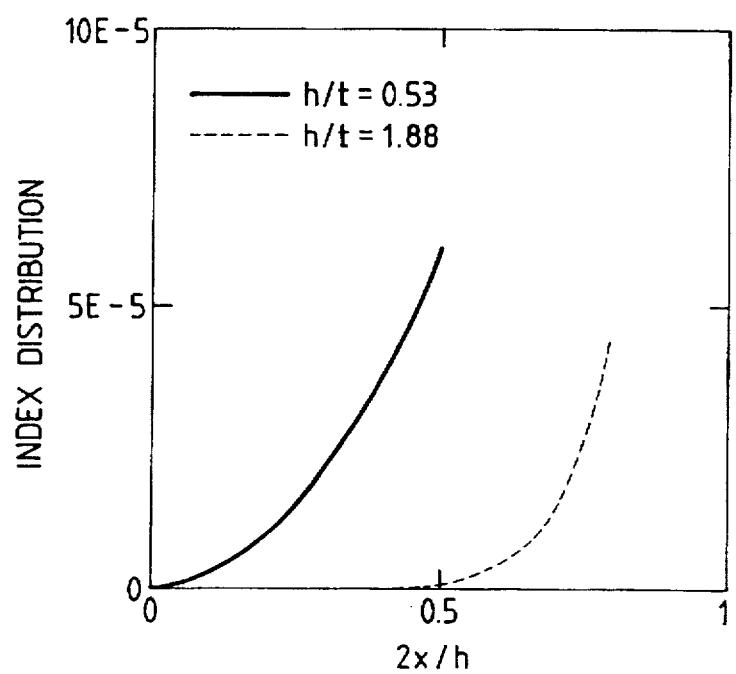
FIG. 8 is a diagram showing two distributions of the refractive index of a plastic lens.

FIG. 8 shows the refractive index distributions that were actually measured on plastic lenses fabricated by injection molding. Two values, 0.53 and 1.88, were used for h/t. The horizontal axis is the x coordinate normalized with h/2, and the vertical axis plots the amount of index variation as referenced against the refractive index on the optical axis. When h/t=0.53, the refractive index varied near the optical axis and an experiment with the actual passage of a light beam showed that the index distribution caused the lens to work as a concave lens just like an "gradient index lens", with the resulting displacement of the focal point and deterioration of the imaging characteristics. On the other hand, when h/t=1.88, the refractive index was substantially constant near the optical axis and there was no deterioration of the imaging characteristics nor displacement of the focal point upon the passage of a light beam.

Thus, (1) a more uniform distribution was attained near the center of the lens as the value of h/t increased; and (2) good results were obtained when h/t=1.88. Considering these facts, h/t is desirably equal to or greater than 1.88 (h/t≧1.88). Since errors in measurement and variations in characteristics must be taken into account in practical applications, it is desirable that with the sub-scanning cross section of the imaging lens 5 which is shown in FIG. 6, the ratio of h (the height of the lens in the sub-scanning direction) to t (the height of the lens in the axial direction) be set to be greater than 2 (h/t>2). If this condition is met, one can insure that the deterioration in the imaging characteristics of the lens and the displacement of the focal point are suppressed to levels that will cause no practical problems.

The upper limit of h/t is dependent on the workmanship, productivity and cost of lens manufacture. Generally speaking, h/t is preferably set below 50 (h/t<50).

Plastic lenses are commonly provided with ribs around their effective area with a view to assuring enhanced strength and moldability. The relation $h/t>2$ holds even if h includes ribs that are indicated by 5 in FIG. 9 and similar results are attained if this relation is satisfied.

Another requirement that need be satisfied by plastic lenses is that their thickness be as uniform as possible since uneven thickness can be a cause of internal strain. If the thickness, t, of an imaging lens in the process of molding with plastics varies greatly in the effective area of the main-scanning cross section, the molten resin will flow unevenly during molding, thereby causing internal strain. To avoid this problem, the imaging lens in Example 1 is designed so that in its effective area, the ratio between the maximum thickness of the lens in the axial direction ($t_{max}$) and its minimum thickness ($t_{min}$) in the same direction is smaller than 2 ($t_{max}/t_{min}<2$). If this condition is met, the internal strain that will develop in the imaging lens can be suppressed to a level that causes no practical problems. Ideally, $t_{max}/t_{min}$ is equal to unity (1) and, hence it is desirable to satisfy the relation $1 \leq t_{max}/t_{min}<2$.

Another feature of the optical scanner according to Example 1 is that the beam admitted into the imaging lens is convergent in the main-scanning cross section. If the incident beam on the imaging lens is parallel or divergent in the main-scanning cross section, the imaging lens must be a positive lens with a large refractive power in order to focus the beam on the scan surface, but then the imaging lens will have an extremely uneven thickness profile in the main-scanning cross section. To avoid this problem, the beam to be introduced into the imaging lens in Example 1 is adapted to be convergent in the main-scanning cross section so that the imaging lens needs to have only a small refractive power to insure that its thickness is as uniform as possible.

It should also be noted that the imaging lens used in Example 1 is an anamorphic lens which has different axial refractive powers in the main and sub-scanning directions. This feature allows the correction of aberrations in the main-scanning direction to be performed independently of the correction in the sub-scanning direction, thus providing greater latitude in optical design to insure that curvature of the field can be reduced in both the main and sub-scanning directions while improving the capability of scanning at uniform speed. As already mentioned, the imaging lens used in Example 1 has the advantage that the shape of the beam spot in the main-scanning direction is deformed only slightly to provide satisfactory imaging characteristics. This makes it possible to provide an optical scanner having satisfactory optical characteristics even if the imaging lens is composed of axially symmetric surfaces. A noteworthy advantage of using an anamorphic imaging lens is that aberrational correction in the main-scanning direction can be performed independently of the correction in the sub-scanning direction and that curvature of the field can be further reduced in both scanning directions. If the field curvature is small, the beam can be stopped down to a diameter close to the diffraction limit and any deformation of the beam spot or any difference in the imaging characteristics becomes pronounced. Therefore, if an anamorphic lens is used to reduce the curvature of the field, one can obtain greater benefits from the ability of the invention to provide satisfactory imaging characteristics.

As mentioned hereinabove, the beam focuses on the reflecting surface of the rotating lens mirror in the sub-scanning cross section. In the example under consideration, the deflecting point and the scan surface are optically conjugated in the sub-scanning cross section and, therefore, even if the rotating lens mirror has a tilting reflecting surface, the position of the beam spot on the scan surface will remain unchanged in the sub-scanning direction and there will be no displacement of the scanning line.

Additionally, the exit surface of the imaging lens used in Example 1 is such that the curvature of a cross section parallel to the sub-scanning cross section varies continuously along the main-scanning direction in the effective area of the imaging lens. With this design feature, the curvature of a cross section parallel to the sub-scanning cross section can be set at a desired value in any position in the effective area of the imaging lens, thereby assuring that curvature of the field in the sub-scanning direction can be fully corrected. As just mentioned above, a reduced field curvature contributes to highlight the ability of the invention to provide satisfactory imaging characteristics.

It should be mentioned that the surface of the imaging lens where the curvature in the sub-scanning direction varies need not be limited to the exit surface and one may vary the curvature of the entrance surface in the sub-scanning direction. All that is needed to correct the field curvature in the sub-scanning direction is just one degree of freedom and the imaging lens may be designed so that at least one of the two surfaces (entrance and exit surfaces) has its curvature vary in the sub-scanning direction. If this requirement is met, the curvature of the other surface in the sub-scanning direction can be set at a desired value.

The imaging lens used in Example 1 is adapted so that the entrance surface has a linear, sub-scanning cross section and it is a planoconvex lens when observed through the sub-scanning cross section. An imaging lens one of the two surfaces of which has a linear sub-scanning cross section can be manufactured easily at a reduced cost. If one lens has two optical curved surfaces, the precision in the relative positions of the optical axes of these surfaces becomes a problem and it is strictly required to achieve alignment between the two optical axes. If the imaging lens is designed as a planoconvex lens when seen through the sub-scanning cross section, there will be no such requirement to satisfy as long as the sub-scanning cross section is concerned.

As already stated hereinabove, the two major characteristics that are required by optics in an optical scanner are the capability of scanning at uniform speed and the flatness of an image plane. Another requirement that may be added is the uniformity of the beam spot size. Since recent models of optical scanners are required to have high scanning density and high resolving power, there has been a growing need to ensure a constant beam spot size in the effective scanning region. To produce a constant beam spot size, one needs to ensure that the optics have a constant optical magnification.

Let us consider specifically the case of providing a constant optical magnification in the sub-scanning direction. In the example under consideration, the light beam is focused in the sub-scanning cross section in the vicinity of the reflecting surface of the rotating lens mirror, so one may ensure a constant optical magnification between the imaging point near the reflecting surface and the imaging point on the scan surface.

Figure 10:
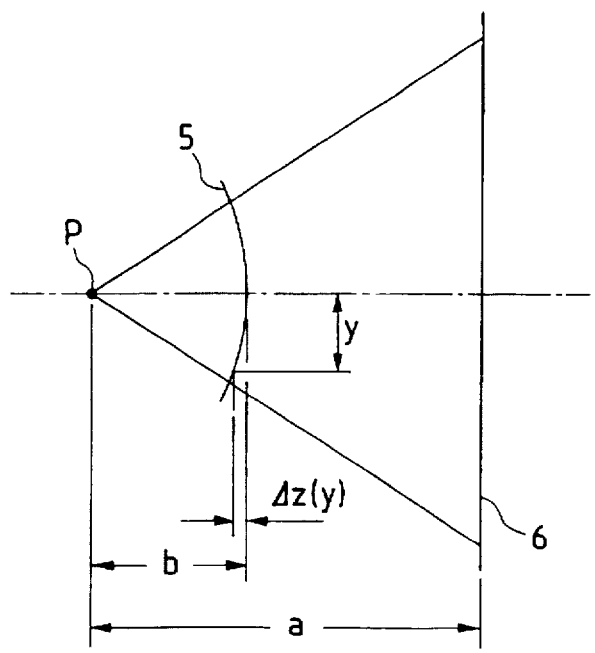
FIG. 10 is a diagram showing the concept of the optics used in Example 1.

To simplify the present discussion, let us assume that the imaging lens 5 is a thin lens as shown in FIG. 10, with the rotating lens mirror being omitted since it does not have any refractive power in the sub-scanning direction. Also assume as follows: the distance from the beam deflecting point P to the scan surface 6 is a, the distance from the deflecting point P to the imaging lens 5 is b, the height from the optical axis in the effective area of the main-scanning cross section of the imaging lens 5 is y, and the axial departure of the imaging lens at height y, as referenced against the point of intersection between the imaging lens 5 and the optical axis is $\Delta z(y)$.

Since the reflecting surface of the rotating lens mirror substantially coincides with the beam deflecting point P, the latter may be regarded as the imaging point. The optical magnification, $\beta(y)$, of the beam in the sub-scanning direction that passes by the position at height y from the optical axis is given by:

$$\beta(y) = \frac{a - (b + \Delta z(y))}{b + \Delta z(y)}$$

According to an experiment conducted by the present inventors, the resolving power of an optical scanner lost uniformity when the beam diameter varied by more than ±20% and a laser beam printer produced prints of deteriorated quality, particularly in patterns of fine dots, which caused uneven densities. To avoid this problem, the optical magnification, $\beta(y)$, at a desired height y from the optical axis, is specified to meet the following condition as referenced against the axial (on-axis) optical magnification $\beta(0)$:

$$\left| \frac{\beta(y)}{\beta(0)} - 1 \right| < 0.2$$

Calculating this condition and performing an approximation, we get:

$$|\Delta z(y)| \left( \frac{1}{a-b} + \frac{1}{b} \right) < 0.2$$

Therefore, an optical scanner that provides uniformity not only in the optical magnification in the sub-scanning direction but also in the resolving power can be realized by satisfying the condition:

$$|\Delta z_i(y)| \left( \frac{1}{a-b_i} + \frac{1}{b_i} \right) < 0.2$$

where $\Delta z_i(y)$ is the axial displacement of the lens surface $S_i$ of the imaging lens at height y in the effective area of the main-scanning cross section, and $b_i$ is the distance from the deflecting point to the lens surface $S_i$. A laser printer incorporating such an improved optical scanner will produce prints of good quality without uneven densities.

Optical data sheets for a typical design of an optical scanner incorporating the concept of Example 1 are given in Tables 1 and 2. The angle through which the lens mirror 4 rotates from the start to the end of one scan cycle is written as $2\omega$. The shape of the aperture in diaphragm 7 is elliptical and has sizes of $p_x$ and $p_y$ in the main and sub-scanning directions, respectively. Semiconductor laser 1 emits from point $S_1$; collimator lens 2 has an entrance surface $S_2$ and an exit surface $S_3$; cylindrical lens 3 has an entrance surface $S_4$ and an exit surface $S_5$; rotating lens mirror 4 has an entrance surface $S_6$, a reflecting surface $S_7$ and an exit surface $S_8$; imaging lens 5 has an entrance surface $S_9$ and an exit surface $S_{10}$. Aperture diaphragm 7 coincides with the entrance surface $S_2$ of collimator lens 2. The symbols of the respective optical parameters in Table 1 have the following meanings: $r_i$, the radius of curvature of the ith surface $S_i$; $d_i$, the axial (on-axis) distance from the ith surface to the next adjacent surface; $n_2$, the refractive index of collimator lens 2; $n_4$ the refractive index of cylindrical lens 3; $n_9$, the refractive index of imaging lens 5; $n_6$ and $n_7$, the refractive indices of rotating lens mirror 4; $r_{ix}$, the radius of curvature of an anamorphic lens surface in the sub-scanning direction; $r_{iy}$, the radius of curvature of the anamorphic lens surface in the main-scanning direction. The radii of curvature of aspheric surfaces are expressed by axial (on-axis) values. The main-scanning cross section of the imaging lens has an aspheric shape, which is expressed by:

$$z_i = \frac{y^2 / r_{iy}}{1 + \sqrt{1 - (K_i + 1)(y/r_{iy})^2}} + A_i y^4 + B_i y^6 + C_i y^8 + D_i y^{10} + E_i y^{12}$$

In a coordinate system in which the origin is the point of intersection between the lens surface and the optical axis, with the z axis extending in the axial direction and the y axis extending in the main-scanning direction normal to the optical axis, $K_i$, $A_i$, $B_i$, $C_i$, $D_i$ and $E_i$ are aspheric coefficients. The exit surface of the imaging lens is such that the curvature of a cross section parallel to the sub-scanning cross section varies continuously along the main-scanning direction in the effective area of the imaging lens and the radius of curvature $R_i$ is expressed by:

$$R_i = r_{ix} + A_{ix} y^2 + B_{ix} y^4 + C_{ix} y^6 + D_{ix} y^8 + E_{ix} y^{10}$$

where $A_{ix}$, $B_{ix}$, $C_{ix}$, $D_{ix}$ and $E_{ix}$ are coefficients.

TABLE 1

| | | $2\omega = 51.2°$ | | |
|---|---|---|---|---|
| $P_x$ Surface, $S_i$ | | 2.14 Radius of curvature, $r_i$ | $P_y$ Airspace between surfaces, $d_i$ | 1.96 Refractive index, $n_i$ |
| $S_1$ | | | 11.579 | |
| $S_2$ | | ∞ | 2.800 | 1.67501 |
| $S_3$ | | −8.438 | 8.000 | |
| $S_4$ | $r_{4x}$ | 36.024 | 3.000 | 1.78565 |
| | $r_{4y}$ | ∞ | | |
| $S_5$ | | ∞ | 31.000 | |
| $S_6$ | $r_{6x}$ | ∞ | 9.000 | 1.78565 |
| | $r_{6y}$ | −32.415 | | |
| $S_7$ | | ∞ | 9.000 | 1.78565 |
| $S_8$ | $r_{8x}$ | ∞ | 18.000 | |
| | $r_{8y}$ | −39.216 | | |
| $S_9$ | $r_{9x}$ | ∞ | 5.500 | 1.51929 |
| | $r_{9y}$ | 28.253 | | |
| $S_{10}$ | $r_{10x}$ | −11.094 | 107.500 | |
| | $r_{10y}$ | 32.639 | | |

TABLE 2

| Aspheric coefficient | | | |
|---|---|---|---|
| $K_9$ | −1 | $K_{10}$ | −1 |
| $A_9$ | −4.1423E-5 | $A_{10}$ | −3.6882E-5 |
| $B_9$ | 7.1621E-8 | $B_{10}$ | 5.6110E-8 |
| $C_9$ | −8.4567E-11 | $C_{10}$ | −6.0091E-11 |
| $D_9$ | 5.7009E-14 | $D_{10}$ | 3.6919E-14 |
| $E_9$ | −1.6817E-17 | $E_{10}$ | −1.0085E-17 |
| | | $A_{10x}$ | −2.4465E-2 |
| | | $B_{10x}$ | 5.5392E-5 |
| | | $C_{10x}$ | −8.6276E-8 |
| | | $D_{10x}$ | 7.7456E-11 |
| | | $E_{10x}$ | −2.7384E-14 |

Figure 11:
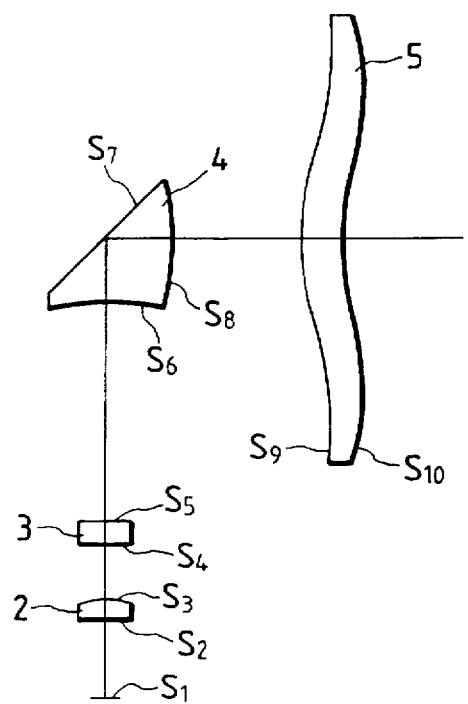
FIG. 11 is a cross-sectional view showing the construction of the optics used in Example 1.
Figure 12A:
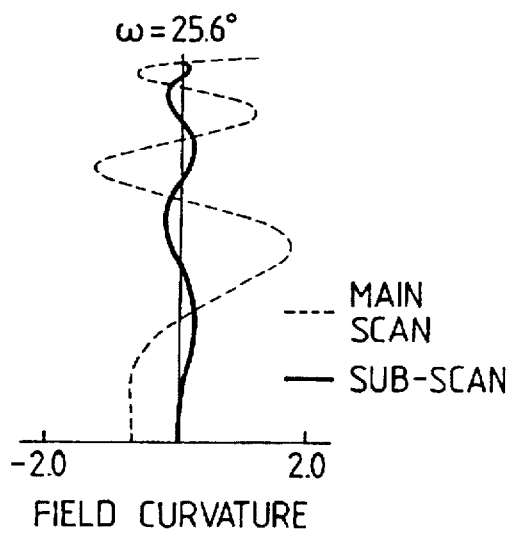
FIGS. 12(a) and 12(b) plot in graphs the aberration curves obtained with the optical scanner of Example 1.
Figure 12B:
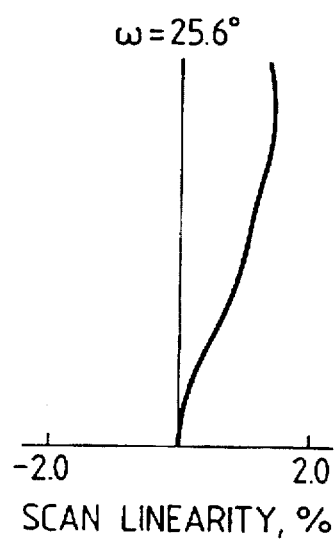

FIG. 11 is a cross section of the optical scanner of Example 1 as taken in the main-scanning direction, and FIG. 12 plots in graphs the aberration curves obtained with the optical scanner of Example 1. The graph for the field curvature shows the aberration in the main-scanning direction by the dashed line, and the aberration in the sub-scanning direction by the solid line. By convention, the linearity in scanning with an imaging lens is expressed by percent departure of actual image height from the ideal y=fθ. However, in Example 1 using the rotating lens mirror 4, the ideal image height is not equal to fθ. Alternatively, an equivalent method of representation is used, in which the departure from the ideal image height Y=ξθ is expressed as a percentage, with ξ being the rate of change in image height as a function of the angle of rotation of lens mirror 4 with respect to paraxial rays. Symbol ω refers to the angle through which the lens mirror 4 rotates while the beam spot scans over the scan surface from the center to either end.

Due to the use of aspheric surfaces, the single imaging lens 5 was sufficient for effective correction of the field curvature along the main-scanning direction, which was held within ±2.0 mm as shown in FIG. 12(a). The residual curvature of the field which varied with an amplitude of about 1–2 mm was due to the fact that the shape of the main-scanning cross section of the imaging lens 5 was assumed to contain only up to 12 orders of aspheric coefficients and the magnitude of the field curvature can be further reduced by using higher-order aspheric coefficients.

The exit surface of the imaging lens 5 was such that the curvature of a cross section parallel to the sub-scanning cross section varied continuously in the main-scanning direction in the effective area of the imaging lens 5 and this contributed to effective correction of the field curvature in the sub-scanning direction, which was held within a very small range of ±0.2 mm as also shown in FIG. 12.

The rate of change in curvature, ρ, through the main-scanning cross section of the imaging lens 5 and other related parameters are contained in the relation expressed by:

$$\frac{1}{2g} \sum_i \rho_i(y_i) e_i u_i w_i^2 (n_i - 1)$$

Figure 13:
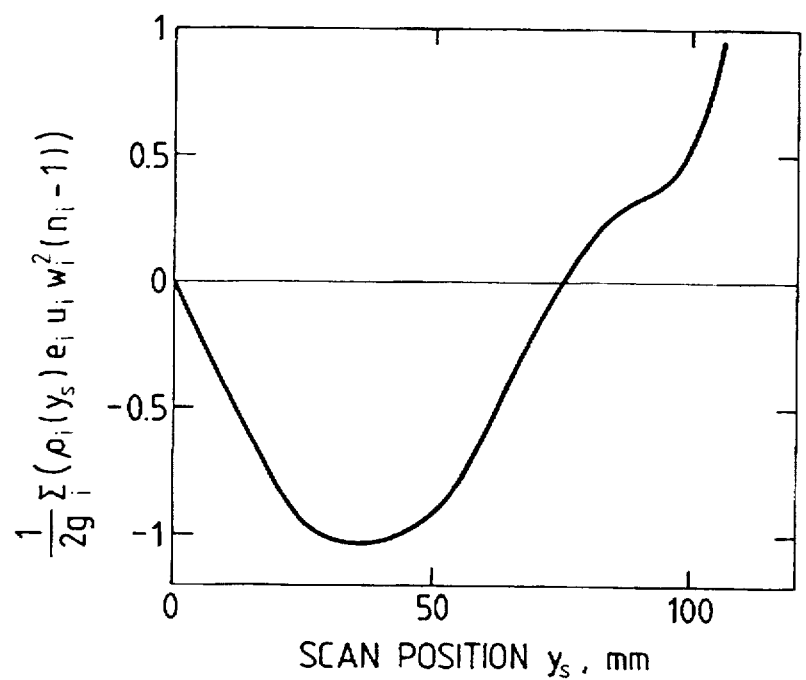
FIG. 13 is a graph plotting the values of a relation of curvature change and other associated parameters to the imaging lens used in Example 1.

As the FIG. 13 graph shows, this relation varies with the height of an image on the scan surface and its absolute value is 1.1 at maximum. The relation is for the sum of the two aspheric surfaces $S_9$ and $S_{10}$ and the values of the respective parameters in the relation are listed below.

TABLE 3

|  | $S_9$ |  | $S_{10}$ |
| --- | --- | --- | --- |
| $e_9$ | 113.0 | $e_{10}$ | 107.5 |
| $n_9$ | 1.51929 | $n_{10}$ | 1.51929 |
| $u_9$ | 1 | $u_{10}$ | −1 |
| $w_9$ | 1.09 | $w_{10}$ | 1.00 |
| $g$ | 0.035 |  |  |

Figure 9:
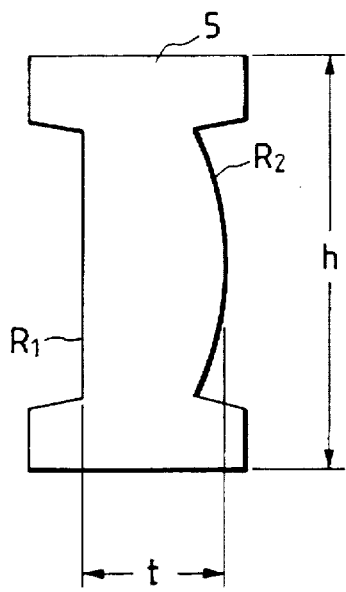
FIG. 9 is a cross section of a ribbed imaging lens as taken in the sub-scanning direction.

The sub-scanning cross section of the imaging lens 5 had a rib on both the top and bottom as shown in FIG. 9. The thickness (t) of the lens was 5.5 mm and its height (h) was 14 mm. Since h/t=2.8, there was no displacement of the focal point and the imaging characteristics of the lens were satisfactory.

The thickness of the imaging lens 5 in its effective area in the axial direction was 5.5 mm at maximum ($t_{max}$) and 3.90 mm at minimum ($t_{min}$). Since $t_{max}/t_{min}=1.41$, the imaging lens 5 is uniform in thickness and this ensure the smooth and even flow of a molten resin during the molding of the lens with plastics in the substantial absence of internal strain.

The beam admitted into the imaging lens 5 was convergent and had a focal point lying 213.86 mm toward the scan surface from the entrance surface of the imaging lens 5. Therefore, the imaging lens 5 needed to have only a small refractive power in the main-scanning direction and this contributed to the uniformity in the thickness of the lens.

The amounts of axial displacements of the surfaces of the imaging lens 5 are expressed by:

$$\Delta z_i(y) \left( \frac{1}{a - b_i} + \frac{1}{b_i} \right)$$

Figure 14:
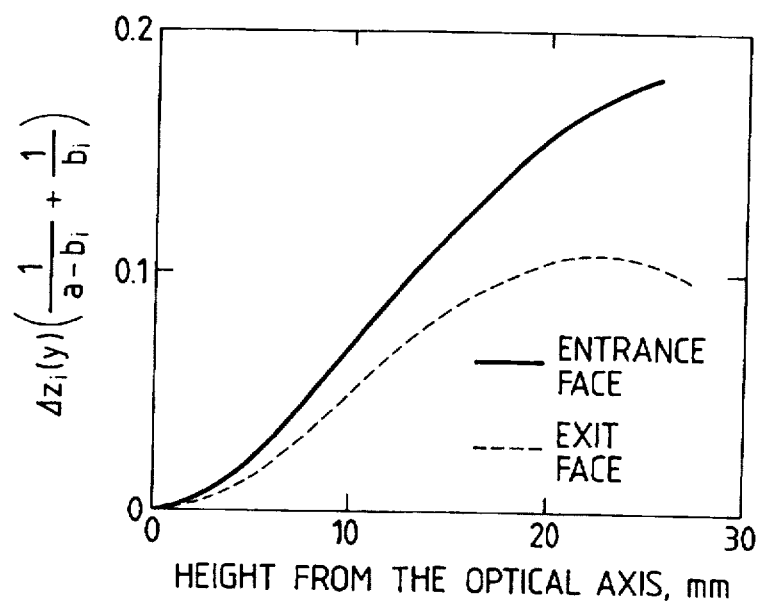
FIG. 14 is a graph plotting the amounts of axial displacements of the surfaces of the imaging lens used in Example 1.
Figure 15:
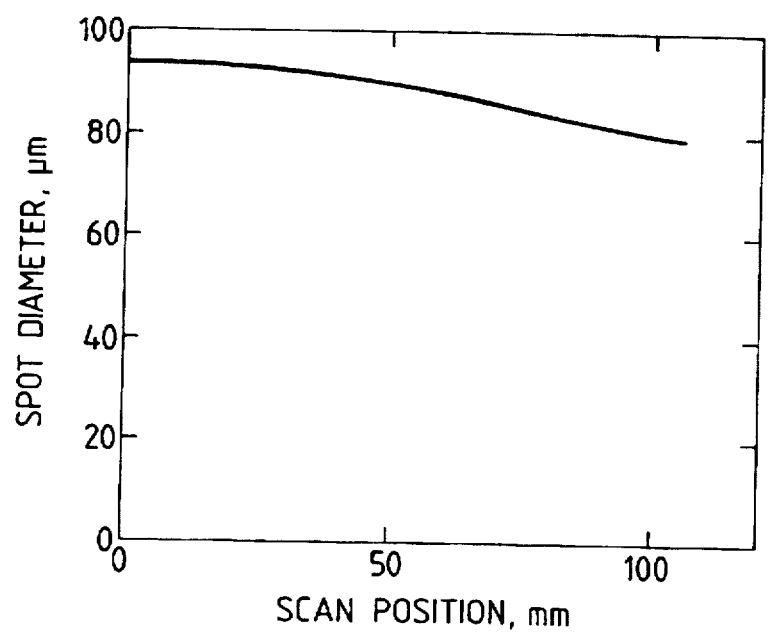
FIG. 15 is a graph plotting the variation in beam spot size that occurred in Example 1.
Figure 16:
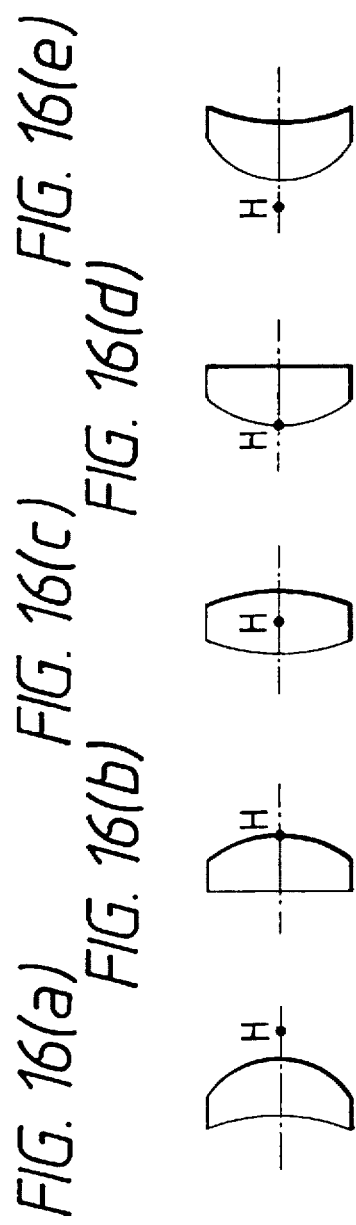
FIGS. 16a–16e are diagrams illustrating various shapes of the imaging lens as produced by "bending"

As the FIG. 14 graph shows, this expression varies within the effective area of the lens and its absolute value is 0.18 at maximum. The variation in beam spot size that occurred in the sub-scanning direction was held within ±10% (see FIG. 15), indicating the uniformity in resolution.

If necessary, the resolution can be made more uniform. In the imaging lens 5 used in Example 1, only the exit surface was adapted so that the curvature of a cross section parallel to the sub-scanning cross section varied continuously along the main-scanning direction. If both surfaces of the imaging lens 5 are adapted to satisfy this condition, the freedom in optical design can be increased by an additional degree in the sub-scanning direction to insure that the beam spot size in the sub-scanning direction can be made completely constant. This may be illustrated by referring to accompanying drawings. According to the design that has been discussed on the foregoing pages, the imaging lens 5 is bent as shown in FIG. 11 and the line connecting the principal points in cross sections that are parallel to the sub-scanning cross section is also bent in substantial conformity with the bending shape of the lens; although this will cause no practical problems, the magnification of the imaging lens 5 varies somewhat in the sub-scanning direction. However, if the radii of curvature of both surfaces of the imaging lens 5 can be set at desired values in any cross section that is parallel to the sub-scanning cross section, the principal point H can also be set at a desired position by "bending" as illustrated in FIGS. 16a–16e. Based on this idea, the radius of curvature in the sub-scanning direction may be set in such a way that the connection of the principal points in any cross sections that are parallel to the sub-scanning cross section produces a straight line normal to the optical axis; by so doing, the optical magnification of the imaging lens 5 in the sub-scanning direction can be made completely constant over the effective scan range and a constant beam spot size can also be attained.

Figure 17:
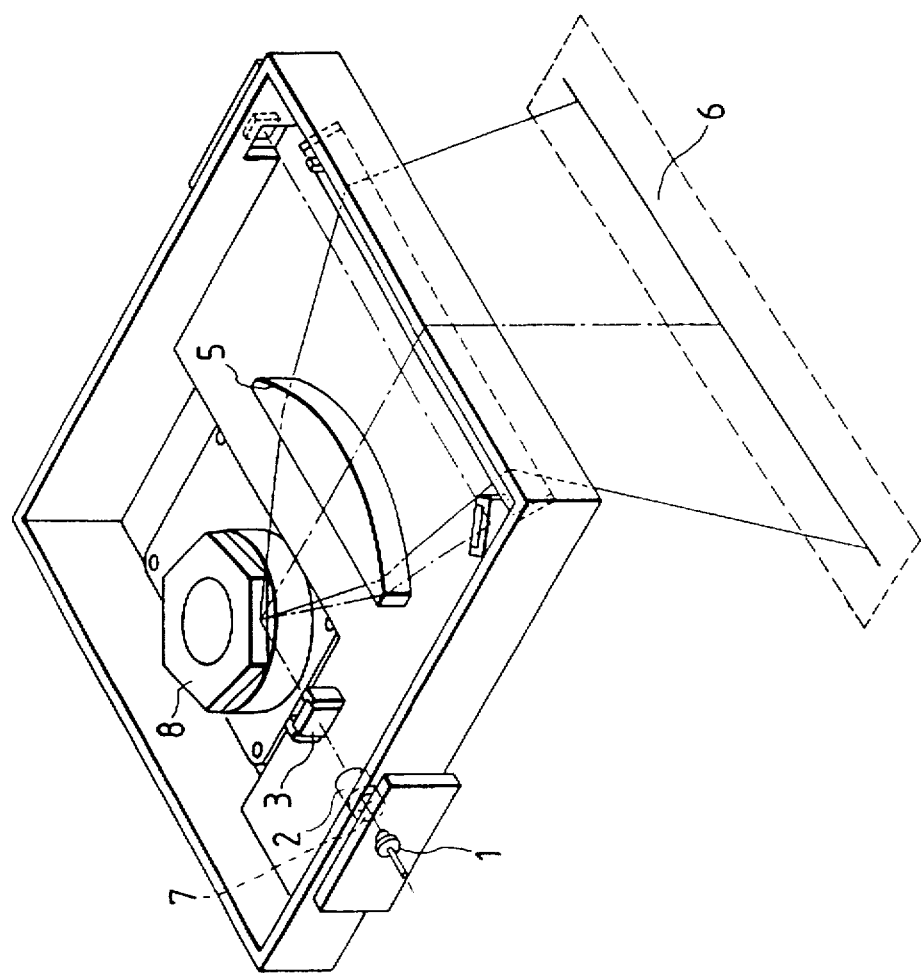
FIG. 17 is a perspective view showing the construction of the optical scanner according to Example 2 of the invention.

FIG. 17 is a perspective view showing the construction of an optical scanner according to Example 2 of the invention. A light beam issuing from a semiconductor laser 1 is stopped down by an aperture diaphragm 7, converted to a parallel beam by a collimator lens 2, and subjected to the focusing action of a cylindrical lens 3 only in the sub-scanning direction. The beam falls on a reflecting surface of a rotating polygonal mirror 8 serving as the deflection means. Imaging occurs only in the sub-scanning direction near the reflecting surface, which reflects the beam. The beam is deflected as the polygonal mirror 8 rotates. The deflected beam is subjected to the focusing action of an imaging lens 5 and forms a beam spot on a scan surface 6.

Optical data sheets for a typical design of an optical scanner incorporating the concept of Example 2 are given in Tables 4 and 5. The angle through which the polygonal mirror 8 rotates from the start to the end of one scan cycle is written as 2ω. The shape of the aperture in diaphragm 7 is elliptical and has sizes of $p_x$ and $p_y$ in the main and sub-scanning directions, respectively. Semiconductor laser 1 emits from point $S_1$; collimator lens 2 has an entrance surface $S_2$ and an exit surface $S_3$; cylindrical lens 3 has an entrance surface $S_4$ and an exit surface $S_5$; rotating polygonal mirror 8 has a plurality of reflecting surfaces $S_6$; imaging lens 5 has an entrance surface $S_7$ and an exit surface $S_8$.

The aperture diaphragm 7 coincides with the entrance surface $S_2$ of collimator lens 2. The symbols of the respective optical parameters in Table 4 have the following meanings: $r_i$, the radius of curvature of the ith surface $S_i$; $d_i$, the axial distance from the ith surface to the next adjacent surface; $n_2$, the refractive index of collimator lens 2; $nz_4$, the refractive index of cylindrical lens 3; $n_7$, the refractive index of imaging lens 5; $r_{ix}$, the radius of curvature of an anamorphic lens surface in the sub-scanning direction; $r_{iy}$, the radius of curvature of the anamorphic lens surface in the main-scanning direction. The radii of curvature of aspheric surfaces are expressed by axial values. The shape of the main-scanning cross section of the imaging lens 5 is aspheric on both the entrance and exit surfaces. The exit surface of the imaging lens is such that the curvature of a cross section parallel to the sub-scanning cross section varies continuously along the main-scanning direction in the effective area of the imaging lens 5. The shape of the surfaces of the imaging lens 5 is expressed by the same formula as in Example 1.

TABLE 4

$2\omega = 40.2°$

| $p_x$ Surface, $S_i$ | | 1.25 Radius of curvature, $r_i$ | $p_y$ Airspace between surfaces, $d_i$ | 1.50 Refractive index, $n_i$ |
|---|---|---|---|---|
| $S_1$ | | | 4.757 | |
| $S_2$ | | ∞ | 2.500 | 1.67500 |
| $S_3$ | | −4.219 | 10.000 | |
| $S_4$ | $r_{4x}$ | 21.461 | 3.000 | 1.51118 |
|  | $r_{4y}$ | ∞ | | |
| $S_5$ | | ∞ | 40.000 | |
| $S_6$ | | ∞ | 40.000 | |
| $S_7$ | $r_{7x}$ | ∞ | 13.000 | 1.48624 |
|  | $r_{7y}$ | 355.146 | | |
| $S_8$ | $r_{8x}$ | −17.800 | 147.000 | |
|  | $r_{8y}$ | −91.105 | | |

TABLE 5

| Aspheric coefficient | | | |
|---|---|---|---|
| $K_7$ | −113.21 | $K_8$ | −0.0990 |
| $A_7$ | 2.9790E-9 | $A_8$ | −1.6901E-8 |
| $B_7$ | −3.1490E-13 | $B_8$ | −2.4712E-12 |
| $C_7$ | −1.3010E-15 | $C_8$ | −3.1711E-16 |
| $D_7$ | −5.6229E-19 | $D_8$ | −1.0642E-19 |
| $E_7$ | 0 | $E_8$ | 0 |
|  |  | $A_{8x}$ | −1.2391E-3 |
|  |  | $B_{8x}$ | 2.4757E-7 |
|  |  | $C_{8x}$ | 4.9306E-11 |
|  |  | $D_{8x}$ | −4.6680E-14 |
|  |  | $E_{8x}$ | 1.3036E-17 |

Figure 18:
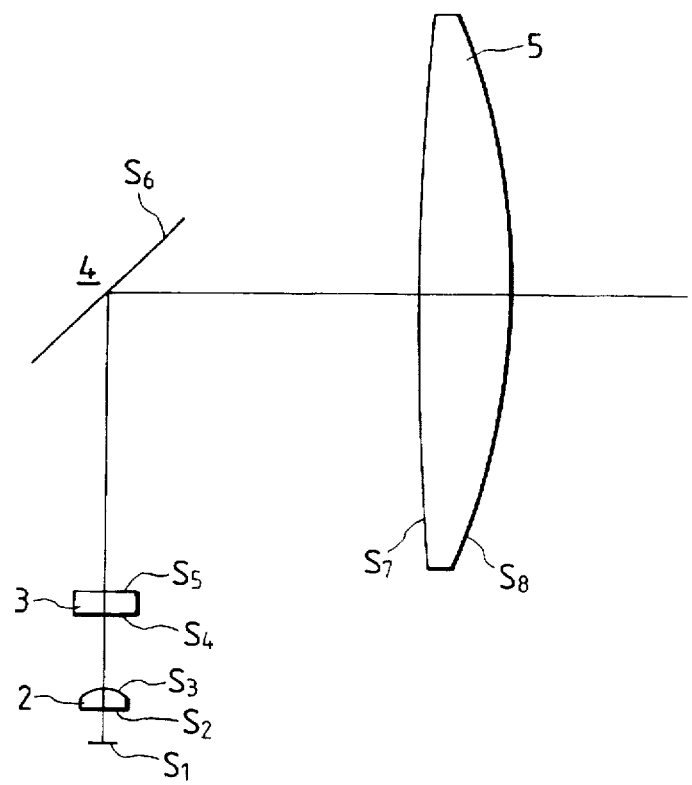
FIG. 18 is a cross-sectional view showing the construction of the optics used in Example 2.
Figures 19A, 19B, 19C:
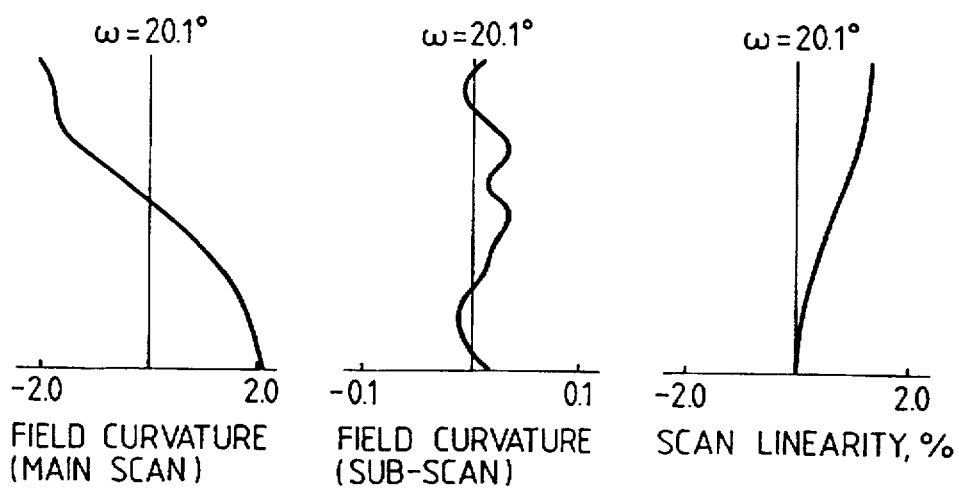
FIGS. 19(a), 19(b) and 19(c) plot in graphs the aberration curves obtained with the optics used in Example 2.

FIG. 18 is a cross section of the optical scanner of Example 2 as taken in the main-scanning direction, and FIG. 19 plots in graphs the aberration curves obtained with the optical scanner of Example 2. Due to the use of aspheric surfaces, the single imaging lens 5 was sufficient for effective correction of the field curvature in the main-scanning direction, which was held within ±2.1 mm as shown in FIG. 19(a). The exit surface of the imaging lens 5 was such that the curvature of a cross section parallel to the sub-scanning cross section varied continuously along the main-scanning direction in the effective area of the imaging lens 5 and this contributed to effective correction of the field curvature in the sub-scanning direction, which was held within a very small range of ±0.1 mm as also shown in FIG. 19(b).

The rate of change in curvature, ρ, through the main-scanning cross section of the imaging lens 5 and other related parameters are contained in the relation expressed by:

$$\frac{1}{2g} \sum_i \rho_i(y_i) e_i u_i w_i^2 (n_i - 1)$$

Figure 20:
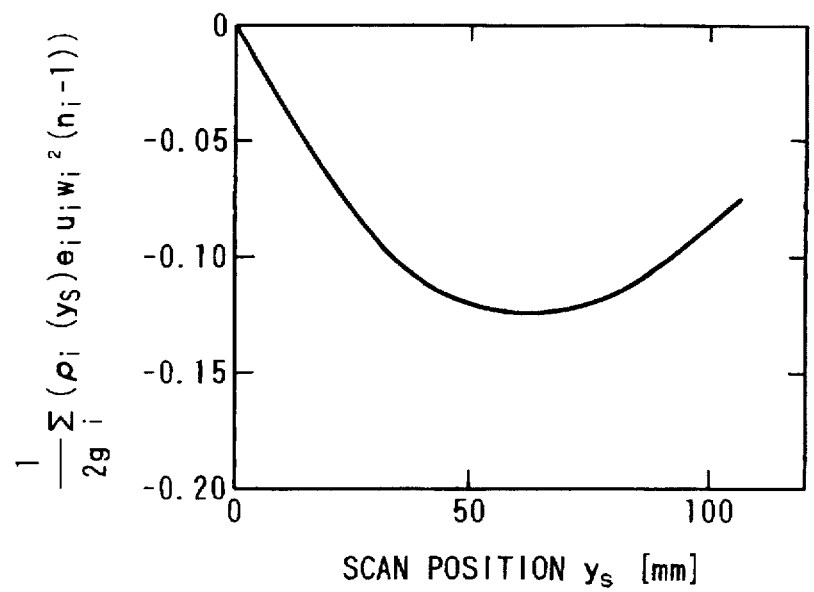
FIG. 20 is a graph plotting the values of a relation of curvature change and other associated parameters to the imaging lens used in Example 2.

As the FIG. 20 graph shows, this relation varies with the height of an image on the scan surface and its absolute value is 0.12 at maximum. The relation is for the sum of the two aspheric surfaces $S_7$ and $S_8$ and the values of the respective parameters in the relation are listed below.

TABLE 6

| $S_7$ | | $S_8$ | |
|---|---|---|---|
| $e_7$ | 160.0 | $e_8$ | 147.0 |
| $n_7$ | 1.48624 | $n_8$ | 1.48624 |
| $u_7$ | 1 | $u_8$ | −1 |
| $w_7$ | 1.50 | $w_8$ | 1.48 |
| $g$ | 0.050 | | |

The amounts of axial displacements of the surfaces of the imaging lens 5 are expressed by:

$$\Delta z_i(y) \left( \frac{1}{a - b_i} + \frac{1}{b_i} \right)$$

Figure 21:
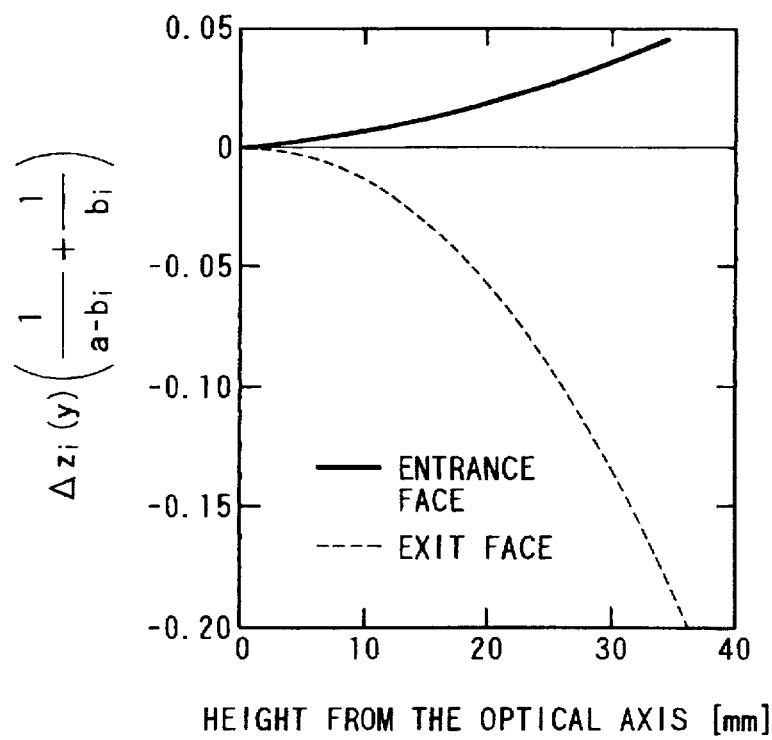
FIG. 21 is a graph plotting the amounts of axial displacements of the surfaces of the imaging lens used in Example 2.

As the FIG. 21 graph shows, this expression varies within the effective area of the lens and its absolute value is no greater than 0.2 at maximum. The variation in beam spot size that occurred in the sub-scanning direction was held within ±2% (see FIG. 22), indicating the uniformity in resolution.

The optical scanner of the invention is applicable not only to laser printers but also to image input devices for use with image forming apparatus such as digital copiers, facsimile equipment and laser scanning displays, as well as to optical mark readers and surface inspecting laser equipment, and the outstanding advantages described hereinabove can also be attained.

As described on the foregoing pages, the optical scanner of the present invention offers the following remarkable advantages.

The deformation of a beam spot can be suppressed to levels that will not cause any practical problems.

The beam spot size can be held constant and this helps the optical scanner produce uniform resolution.

The refractive index distribution is reduced in a direction perpendicular to the beam travel and this is effective in preventing the displacement of the focal point or the deterioration in the imaging characteristics.

The tendency of a molten synthetic resin to flow unevenly during lens molding is inhibited to enable the manufacture of lenses of good characteristics which are free from the development of internal strain.

The imaging lens needs to have only a small refractive power and, as a result, the thickness of the lens can be brought close to uniformity, which is very advantageous from the viewpoint of productivity and cost.

The correction of aberrations in the main-scanning direction can be performed independently of the correction in the sub-scanning direction and this contributes to a greater degree of freedom in optical design. As a result, curvature of the field can be suppressed to small degrees in both the main and sub-scanning directions and, at the same time, the scanning property at uniform speed is improved.

The position of a beam spot on the scan surface in the sub-scanning direction will not change even if the rotating polygonal mirror or lens mirror has a tilting reflecting surface and, as a result, the displacement of the scanning line can be prevented.

The curvature of a cross section parallel to the sub-scanning cross section can be set at a desired value in any position in the effective area of the imaging lens and this allows for complete correction of curvature of the field that may occur in the sub-scanning direction.

Ease is provided in manufacturing the imaging lens and this contributes to a reduced production cost. Additionally, there is no need to maintain high precision in the relative positions of the optical axes of the two lens surfaces or to achieve alignment between the two optical axes. This is a great benefit from the viewpoint of efficient assembling and lens precision.

The degree of freedom in optical design can be further increased in the sub-scanning direction and this helps produce a truly constant beam spot size in the sub-scanning direction.

What is claimed is:

1. An optical scanner comprising:

a light source for emitting a light beam;

deflection means for deflecting the light beam as said deflection means rotates at a uniform angular velocity; and an imaging lens for forming a beam spot on a scanning surface by focusing the light beam that has been deflected by the deflection means, wherein said imaging lens comprises a single lens, and wherein a curvature of a cross section, in parallel to a sub-scanning surface, of one surface on an incidental side and on an emergent side of said imaging lens continuously changes in a main-scanning direction in an effective area of the main-scanning cross section of said imaging lens, and wherein said optical scanner further satisfies the following condition in an effective area of the lens surface $S_i$ of the imaging lens:

$$|\Delta z_i(y)|\{1/(a-b_i)+1/b_i\}<0.2$$

where $\Delta z_i$ is the axial displacement of the lens surface $S_i$ at a height (y) from the optical axis in relation to the lens surface position on the optical axis, the height (y) being parallel to the main-scanning direction;

$b_i$ is the distance from a deflecting point of the deflection means to the lens surface $S_i$; and (a) is the distance from the deflecting point to the scanning surface, and wherein $w_i \leq 1.5$ mm, where $w_i$ is a radius of a main-scanning cross section of the light beam at the lens surface $S_i$.

2. An optical scanner according to claim 1, wherein said imaging lens is made of plastic.

3. An optical scanner according to claim 1, which further satisfies the following condition in an effective area of the main-scanning cross section of the imaging lens:

$$h/t>2$$

where t: a thickness of the imaging lens in a direction of the optical axis; and h: a height of the imaging lens in the sub-scanning direction.

4. An optical scanner according to claim 1, which further satisfies the following condition in an effective area of the main-scanning cross section of the imaging lens:

$$t_{max}/t_{min}<2$$

where $t_{max}$: maximum thickness of the imaging lens in a direction of the optical axis; and $t_{min}$: minimum thickness of the imaging lens in the direction of the optical axis.

5. An optical scanner according to claim 1, wherein the deflecting point and the scanning surface are optically conjugated in a sub-scanning cross direction.

* * * * *